US012612578B2

(12) United States Patent
Coope-Epstein et al.

(10) Patent No.: US 12,612,578 B2
(45) Date of Patent: Apr. 28, 2026

(54) LAUNDRY DETERGENT COMPOSITIONS

(71) Applicant: Henkel AG & Co. KGaA, Duesseldorf (DE)

(72) Inventors: Janet Coope-Epstein, Trumbull, CT (US); Adam Winfield Germain, Watertown, CT (US)

(73) Assignee: Henkel AG & Co. KGaA, Dusseldorf (DE)

( * ) Notice: Subject to any disclaimer, the term of this patent is extended or adjusted under 35 U.S.C. 154(b) by 319 days.

(21) Appl. No.: 18/539,868

(22) Filed: Dec. 14, 2023

(65) Prior Publication Data

US 2024/0240113 A1 Jul. 18, 2024

Related U.S. Application Data

(60) Provisional application No. 63/479,930, filed on Jan. 13, 2023.

(51) Int. Cl.

*C11D 1/00* (2006.01)
*C11D 1/755* (2006.01)
*C11D 1/825* (2006.01)
*C11D 3/10* (2006.01)
*C11D 3/386* (2006.01)

(52) U.S. Cl.

CPC .............. *C11D 1/755* (2013.01); *C11D 1/825* (2013.01); *C11D 3/10* (2013.01); *C11D 3/386* (2013.01)

(58) Field of Classification Search

CPC ........... C11D 1/755; C11D 1/825; C11D 3/10; C11D 3/386; C11D 1/06; C11D 1/72; C11D 1/29
USPC ........ 510/130, 242, 321, 328, 337, 352, 375
See application file for complete search history.

(56) References Cited

U.S. PATENT DOCUMENTS

2012/0172281 A1* 7/2012 Scheibel ................ C11D 1/146
568/687
2017/0121641 A1 5/2017 Smith

FOREIGN PATENT DOCUMENTS

WO WO-2022122425 A1 6/2022
WO WO-2022219102 A1 10/2022

OTHER PUBLICATIONS

SCS Standards "SCS Certification Standard for Biobased Content: SCS-114 Biobased Content Standard," Version 1.0, pp. 1-21 (Mar. 2023).

* cited by examiner

*Primary Examiner* — Eisa B Elhilo
(74) *Attorney, Agent, or Firm* — Sterne, Kessler, Goldstein & Fox P.L.L.C.

(57) ABSTRACT

The present disclosure provides aqueous liquid detergent and liquid unit dose detergent compositions comprising at least one surfactant wherein at least 20% of the carbon content of the surfactant is derived from bio-content and accounted for using a mass balanced allocation method; at least one additive; and water.

21 Claims, No Drawings

LAUNDRY DETERGENT COMPOSITIONS

CROSS REFERENCE TO RELATED APPLICATIONS

The present application claims the priority benefit of U.S. Provisional Application No. 63/479,930, filed Jan. 13, 2023, which is hereby incorporated by reference in its entirety.

FIELD OF DISCLOSURE

This application relates to aqueous liquid laundry and liquid unit dose detergent compositions comprising surfactants sourced from renewable carbon for laundry and beauty application, as well as its uses and manufacture.

BACKGROUND

In order to combat the negative effects of climate change, there is a growing desire worldwide to replace products derived from petroleum with comparable products derived from renewable and more sustainable sources of carbon. Laundry detergents are no exception.

Aqueous liquid detergent and liquid unit dose laundry detergent compositions often comprise the surfactants SLES (sodium lauryl ether sulfate) and alcohol ethoxylate. One type of SLES chemistry is $C_{12}$-$C_{15}$ alcohol ethoxylate sulfate with 3 moles of ethylene oxide per mole of alcohol. The carbon in the SLES is derived from petroleum. One type of alcohol ethoxylate is $C_{12}$-$C_{15}$ alcohol ethoxylate containing an average of approximately 7 moles of ethylene oxide per mole of alcohol. The carbon in the alcohol ethoxylate is derived from petroleum. Surfactants are the main cleaning ingredients present in liquid laundry detergent compositions.

Consumers are becoming increasingly aware of the environmental impact of products they use, and they are starting to demand products which are not derived from petroleum sources. As such, there is a need for surfactants which are sourced from renewable carbon. There is also a need for surfactants which have good cleaning performance.

BRIEF SUMMARY

In some aspects, provided herein is a detergent composition comprising at least one surfactant comprising an alkyl chain and at least two ethoxylate units wherein at least 20% of the carbon content of the surfactant is derived from bio-content and accounted for using a mass balanced allocation method; at least one additive; and water.

In some aspects provided herein is a liquid laundry detergent comprising about 0.1 wt. % to about 35 wt. % of at least one surfactant comprising an alkyl chain and at least two ethoxylate units wherein at least 20% of the carbon content of the at least one surfactant is derived from bio-content and accounted for using a mass balanced allocation method; at least one additive; an alkaline salt; and water.

In some aspects provided herein is a liquid laundry detergent composition comprising: about 0.1 wt. % to about 35 wt. % of at least one surfactant comprising an alkyl chain and at least two ethoxylate units wherein at least 20% of the carbon content of the at least one surfactant is derived from bio-content and accounted for using a mass balanced allocation method; at least one additive; water; and at least one enzyme.

In some aspects, a mass balanced allocation method refers to a traceability protocol to match carbon output with carbon input according to the equation below $$\text{Input mass of eligible biomass } X \text{ Conversion Factor} = \text{Mass of biobased output to be allocated to product}$$

wherein eligible biomass is raw materials and waste of biological origin, and biobased output is the mass of biomass or biobased allocations to be assigned to products from a chemical process or series of processes, and wherein the conversion factor is calculated based on the following equation:

$$\text{Conversion Factor} = \frac{\text{Sum of mass of all eligible outputs}}{\text{Sum of mass of all eligible inputs}},$$

wherein eligible inputs are the eligible biomass, and eligible outputs are the products collected from the chemical process or series of processes, and wherein the conversion factor is derived from process operational data.

In some aspects, the at least one additive is selected from surfactants, soaps, alkalinity agents, buffers, chelating agents, builders, preservatives, polymers, enzymes, fragrances, dyes, and any combination thereof.

In some aspects, the alkyl chain of the at least one surfactant contains a $C_{12}$-$C_{15}$ chain.

In some aspects, the at least one surfactant is selected from an alcohol ethoxylate, an alkyl ether sulfate, and an alkyl ether carboxylate.

In some aspects, the at least one surfactant has an average of about 2 to 10 moles of ethylene oxide per mole of alcohol.

In some aspects, the at least one surfactant is sodium lauryl ether sulfate (SLES), an alcohol ethoxylate, or combinations thereof.

In some aspects, the at least one surfactant is present in an amount of about 0.1 wt. % to about 35 wt. %.

In some aspects, the at least one surfactant comprises branching in an alkyl chain.

In some aspects, the at least one additive is derived from petroleum, plants, or other biobased sources.

In some aspects, the composition is a unit dose laundry detergent.

In some aspects, the composition is a hand soap detergent.

In some aspects, the composition comprises SLES in an amount of about 1 wt. % to about 15 wt. % and an alcohol ethoxylate in an amount of about 0.1 wt. % to about 20 wt. %.

In some aspects, the alkaline salt is selected from sodium carbonate, sodium bicarbonate, sodium chloride, and calcium chloride.

In some aspects, the enzymes are selected from proteases, amylases, lipases, and mannanases.

DETAILED DESCRIPTION

In some aspects provided herein is a unit dose laundry detergent composition comprising at least one surfactant comprising an alkyl chain and at least two ethoxylate units wherein at least 20% of the carbon content of the surfactant is derived from bio-content and accounted for using a mass balanced allocation method; at least one additive; and water.

In some aspects provided herein is a liquid laundry detergent comprising about 0.1 wt. % to about 35 wt. % of at least one surfactant comprising an alkyl chain and at least two ethoxylate units wherein at least 20% of the carbon content of the at least one surfactant is derived from bio-content and accounted for using a mass balanced allocation method; at least one additive; an alkaline salt; and water.

In some aspects provided herein is a liquid laundry detergent composition comprising: about 0.1 wt. % to about 35 wt. % of at least one surfactant comprising an alkyl chain and at least two ethoxylate units wherein at least 20% of the carbon content of the at least one surfactant is derived from bio-content and accounted for using a mass balanced allocation method; at least one additive; water; and at least one enzyme.

Non-limiting examples of the various aspects are shown in the present disclosure.

Definitions

In order that the present disclosure can be more readily understood, certain terms are first defined. Additional definitions are set forth throughout the detailed disclosure.

All of the various aspects, embodiments, and options disclosed herein can be combined in any and all variants unless otherwise specified. Terms in this application control in the event of a conflict with a patent or publication term that is incorporated by reference.

As used herein, "a," "an," or "the" means one or more unless otherwise specified.

Furthermore, "and/or", where used herein, is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

Open terms such as "include," "including," "contain," "containing" and the like mean "comprising." The term "or" can be conjunctive or disjunctive.

It is understood that wherever aspects are described herein with the language "comprising," otherwise analogous aspects described in terms of "consisting of" and/or "consisting essentially of" are also provided.

Some inventive embodiments contemplate numerical ranges. Every numerical range provided herein includes the range endpoints as individual inventive embodiments. When a numerical range is provided, all individual values and sub-ranges therein are present as if explicitly written out.

The term "about" includes the recited number ±10%. For example, "about 10" means 9 to 11.

The phrase "substantially free of" means that a composition contains little no specified ingredient/component, such as less than about 5% by weight, less than about 4% by weight, less than about 3% by weight, less than about 2% by weight, or less than about 1% by weight of the specified ingredient.

As used herein, the "%" described in the present application refers to the weight percentage unless otherwise indicated.

The term "at least" prior to a number or series of numbers is understood to include the number adjacent to the term "at least," and all subsequent numbers or integers that could logically be included, as clear from context. For example, "at least one non-aqueous solvent" means that 1, 2, 3, or more non-aqueous solvents have the indicated property. When at least is present before a series of numbers or a range, it is understood that "at least" can modify each of the numbers in the series or range. "At least" is also not limited to integers (e.g., "at least 5%" includes 5.0%, 5.1%, 5.18% without consideration of the number of significant figures).

Unless stated otherwise, the term "by weight of the composition" refers to a composition of a final product derived from a process, unless otherwise defined.

The terms "textile" and "fabric" can be used interchangeably.

The terms "fragrance" and "perfume" can be used interchangeably.

The terms "capsule", "microcapsule", and "encapsulate" can be used interchangeably.

The terms "process" and "method" can be used interchangeably.

The terms "alkoxylate" or "alkoxylated" as used in the present application means: the presence of a polyaliphatic ether moiety in a compound, such as ethoxylate ($-CH_2CH_2O-$) or propoxylate ($-CH(CH_3)CH_2O-$). A polyethoxylate is multiple repeat units of ethoxylate ($(-CH_2CH_2O-)_n$), and a polypropoxylate is multiple repeat units of propoxylate ($(-CH(CH_3)CH_2O-)_m$). The subscripts "n" and "m" are the same or different and each is an integer of 1 to 100 (e.g., 1 to 90, 1 to 80, 1 to 70, 1 to 60, 1 to 50, 1 to 40, 1 to 30, 1 to 20, 1 to 15, 1 to 14, 1 to 13, to 13, 1 to 12, 1 to 11, 1 to 10, 1 to 9, 1 to 8, 1 to 7, 1 to 6, 1 to 5, or 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, or 100).

The terms "ethoxylate" or "ethoxylated" as used in the present application means the presence of multiple repeat units of ethoxylate ($(-CH_2CH_2O-)_n$). The subscript "n" is an integer of 1 to 100 (e.g., 1 to 90, 1 to 80, 1 to 70, 1 to 60, 1 to 50, 1 to 40, 1 to 30, 1 to 20, 1 to 15, 1 to 14, 1 to 13, to 13, 1 to 12, 1 to 11, 1 to 10, 1 to 9, 1 to 8, 1 to 7, 1 to 6, 1 to 5, or 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, or 100).

The term "fragrance encapsulate" refers a core-shell structure which comprises a microcapsule (shell) and a fragrance (core) entrapped in the microcapsule. The weight of a fragrance encapsulate is the sum of the weight of the microcapsule and the weight of the fragrance (core) entrapped in the microcapsule.

The term "encapsulated fragrance slurry" refers a core-shell structure which comprises a microcapsule (shell) and a fragrance (core) entrapped in the microcapsule and the water and other ingredients that compose a commercially available fragrance encapsulated slurry. The weight of an encapsulated fragrance slurry is the sum of the weight of the microcapsule, the weight of the fragrance (core) entrapped in the microcapsule, the weight of the water and the weight of the other ingredients.

The term "encapsulated fragrance" refers a fragrance entrapped in the microcapsule. The weight of an encapsulated fragrance is the weight of the fragrance entrapped in the microcapsule, not including the weight of the microcapsule.

The term "bio-content" refers to material from substances derived from living (or once living) organisms or biomass, for example, ethanol derived from corn, soy, legumes, bacteria, algae, etc.

The term "biomass" or "eligible biomass" refers to raw materials and waste of biological origin. The raw materials and waste can be from, for example, agriculture, including vegetal and animal substances, from forestry and related industries, including fisheries and aquaculture, as well as waste, including industrial and municipal waste of biological origin The term "allocation" refers to an amount of biomass assigned to a particular product.

The term "biobased outputs" refers to the mass of biomass, or biobased allocations, to be assigned to products from a chemical process or series of processes.

The term "conversion factor" refers to the mass fraction of biobased and other eligible inputs converted to eligible products.

The term "mass balance" refers to a traceability protocol to match outputs with inputs according to a specific conversion factor, within a predefined system boundary during a given time period.

The term "traceability" refers to the ability to trace materials and/or products sequentially throughout a manufacturing process and/or value chain in a way that is verifiable through objective evidence.

The term "waste" refers to anything for which the generator or holder has no further use and whish is discarded or is released to the environment.

The term "Standard" refers to the Scientific Certification System (SCS) Certification Standard for Biobased Content, SCS-144.

The term "eligible inputs" refers to eligible biomass.

The term "eligible outputs" refers to the products collected from the chemical process or series of processes.

Mass Balanced Bio-Content Description

A variety of chemicals whose carbon has been traditionally obtained from petroleum, are now being manufactured using bio-content derived from mass balance allocation.

The renewable source of carbon may be derived from virgin plant materials, from biomass, or from recycled plant based feedstocks. Plant sources may be palm oil, corn oil, soybean oil. Feedstock may also be non-oil feedstocks such as biomass. Biomass is a broad term which encompasses any portion of the plant. Examples include wood and wood processing wastes, agricultural crops and waste materials such as corn, soybeans, sugar cane, switchgrass, woody plants, algae and crop and food processing residues. Explanation of biomass is found on the U.S. Energy Information Administration Information website: https://www.eia.gov/energyexplained/biomass/.

In the interest of maximizing economies of scale, the renewable source of carbon is often mixed with petroleum sources of carbon for manufacturing efficiency of the surfactants. Tracking of the renewable source of carbon can be achieved through certification using the mass balance approach. See Mass balance white paper by Ellen Macarthur foundation: https://ellenmacarthurfoundation.org/white-papers-and-articles.

Laundry Detergent Compositions with the Biomass Balance Approach

In some aspects, the disclosure describes herein laundry detergent compositions comprising surfactants which are manufactured from renewable sources of carbon using the biomass balance approach. In some aspects, the surfactants are selected from an SLES and/or an alcohol ethoxylate.

In some aspects, the SLES is a $C_{12}$-$C_{15}$ alcohol ethoxylate sulfate with 3 moles of ethylene oxide per mole of alcohol. In some aspects, the carbon in the SLES is derived from renewable sourcing and is tracked in a formula by mass balance accounting. In some aspects, the alcohol ethoxylate is a $C_{12}$-$C_{15}$ alcohol ethoxylate containing an average of approximately 7 moles of ethylene oxide per mole of alcohol.

In some aspects, the carbon is derived from renewable resources and is tracked in the formula by mass balance accounting.

An advantage of surfactants derived from renewable resources and tracked by mass balance accounting (hereafter called biomass balanced surfactants) is that renewable carbon is first converted to simple chemical building blocks such as ethanol or ethylene. The ethanol or ethylene is then used to produce the exact same surfactants as those derived from petroleum based ethylene. In this way, laundry detergent compositions and products have the exact same performance as traditional petroleum derived surfactants.

As disclosed herein, surprisingly, surfactants derived from bio-content and accounted for using a mass balanced allocation method have higher performance compared to plant based surfactants currently used to make laundry detergents.

Detergent Composition

In one aspect, the present disclosure provides a unit dose laundry detergent composition comprising at least one surfactant comprising an alkyl chain and at least two ethoxylate units wherein at least 20% of the carbon content of the surfactant is derived from bio-content and accounted for using a mass balanced allocation method; at least one additive selected from surfactants, soaps, alkalinity agents, buffers, chelating agents, builders, preservatives, polymers, enzymes, fragrances, dyes, and any combination thereof; and water, wherein a mass balanced allocation method refers to a traceability protocol to match carbon output with carbon input according to the equation below $$\text{Input mass of eligible biomass } X \text{ Conversion Factor} = \text{Mass of biobased output to be allocated to product}$$

wherein eligible biomass is raw materials and waste of biological origin, and biobased output is the mass of biomass or biobased allocations to be assigned to products from a chemical process or series of processes, and wherein the conversion factor is calculated based on the following equation:

$$\text{Conversion Factor} = \frac{\text{Sum of mass of all eligible outputs}}{\text{Sum of mass of all eligible inputs}},$$

wherein eligible inputs are the eligible biomass, and eligible outputs are the products collected from the chemical process or series of processes, and wherein the conversion factor is derived from process operational data.

In one aspect, the present disclosure provides a liquid laundry detergent composition comprising about 0.1 wt. % to about 35 wt. % of at least one surfactant comprising an alkyl chain and at least two ethoxylate units wherein at least 20% of the carbon content of the at least one surfactant is derived from bio-content and accounted for using a mass balanced allocation method; at least one additive selected from surfactants, soaps, alkalinity agents, buffers, chelating agents, builders, preservatives, polymers, enzymes, fragrances, dyes, and any combination thereof; an alkaline salt; and water, wherein a mass balanced allocation method refers to a traceability protocol to match carbon output with carbon input according to the equation below $$\text{Input mass of eligible biomass } X \text{ Conversion Factor} = \text{Mass of biobased output to be allocated to product}$$

wherein eligible biomass is raw materials and waste of biological origin, and biobased output is the mass of biomass or biobased allocations to be assigned to products from a chemical process or series of processes, and wherein the conversion factor is calculated based on the following equation:

$$\text{Conversion Factor} = \frac{\text{Sum of mass of all eligible outputs}}{\text{Sum of mass of all eligible inputs}}$$

wherein eligible inputs are the eligible biomass, and eligible outputs are the products collected from the chemical process or series of processes, and wherein the conversion factor is derived from actual process operational data.

In one aspect, the present disclosure provides a liquid laundry detergent composition comprising about 0.1 wt. % to about 35 wt. % of at least one surfactant comprising an alkyl chain and at least two ethoxylate units wherein at least 20% of the carbon content of the at least one surfactant is derived from bio-content and accounted for using a mass balanced allocation method; at least one additive selected from surfactants, soaps, alkalinity agents, builders, buffers, chelating agents, preservatives, polymers, fragrances, dyes, and any combination thereof; water; and at least one enzyme;

wherein a mass balanced allocation method refers to a traceability protocol to match carbon output with carbon input according to the equation below $$\text{Input mass of eligible biomass } X \text{ Conversion Factor} = \text{Mass of biobased output to be allocated to product}$$

wherein eligible biomass is raw materials and waste of biological origin, and biobased output is the mass of biomass or biobased allocations to be assigned to products from a chemical process or series of processes, and wherein the conversion factor is calculated based on the following equation:

$$\text{Conversion Factor} = \frac{\text{Sum of mass of all eligible outputs}}{\text{Sum of mass of all eligible inputs}},$$

wherein eligible inputs are the eligible biomass, and eligible outputs are the products collected from the chemical process or series of processes, and wherein the conversion factor is derived from actual process operational data.

In some aspects, at least 10% of the carbon content of the at least one surfactant is derived from bio-content and accounted for using a mass balanced allocation method. In some aspects, at least 15% of the carbon content of the at least one surfactant is derived from bio-content and accounted for using a mass balanced allocation method. In some aspects, at least 20% of the carbon content of the at least one surfactant is derived from bio-content and accounted for using a mass balanced allocation method. In some aspects at least 25%, at least 30%, at least 35%, at least 40%, at least 45%, and least 50%, at least 55%, at least 60%, at least 70%, at least 80%, at least 90%, at least 100%, or any range or value between any two preceding values, of the carbon content of the at least one surfactant is derived from bio-content and accounted for using a mass balanced allocation method.

In some aspects, the at least one surfactant is present in an amount of about 0.1 wt. % to about 60 wt. %. In some aspects, the at least one surfactant is present in an amount of from about 1 wt. % to about 60 wt. %, about 2 wt. % to about 60 wt. %, about 5 wt. % to about 55 wt. %, about 10 wt. % to about 55 wt. %, about 12 wt. % to about 50 wt. %, about 1 wt. % to about 45 wt. %, about 2 wt. % to about 45 wt. %, about 5 wt. % to about 45 wt. %, about 10 wt. % to about 45 wt. %, about 12 wt. % to about 45 wt. %, about 0.1 wt. % to about 40 wt. %, about 2 wt. % to about 35 wt. %, about 2 wt. % to about 30 wt. %, about 2 wt. % to about 25 wt. %, about 4 wt. % to about 20 wt. %, 4 wt. % to about 15 wt. %, or any value or range between any two of the preceding values of at least one surfactant. In some aspects, the at least one surfactant is present in an amount of about 0.1 wt. % to about 35 wt. %.

In some aspects, the at least one surfactant is present in an amount of about 0.1 wt. %, about 1 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, or any value or range between any two preceding values. In some aspects, the at least one surfactant is present in an amount of about 6 wt. %. In some aspects, the at least one surfactant is present in an amount of about 12 wt. %. In some aspects, the at least one surfactant is present in an amount of about 18 wt. %.

In some aspects, the alkyl chain of the at least one surfactant contains a $C_8$-$C_{20}$ chain. In some aspects, the alkyl chain of the at least one surfactant contains a $C_8$-$C_{18}$ chain, a $C_{10}$-$C_{18}$ chain, a $C_{10}$-$C_{16}$ chain, a $C_{12}$-Cis chain, a $C_{12}$-$C_{20}$ chain, or a value range between any two preceding values. In some aspects, the alkyl chain of the at least one surfactant contains a $C_{12}$-$C_{15}$ chain.

In some aspects, the at least one surfactant comprises branching in an alkyl chain.

In some aspects, provided herein is a detergent composition comprising at least one surfactant having an average of about 2 to 20 moles of ethylene oxide per mole of alcohol. In some aspects, the at least one surfactant has an average of about 2 to 18 moles, about 2 to 16 moles, about 2 to 14 moles, about 2 to 12 moles, about 2 to 10 moles, about 2 to 8 moles, about 2 to 6 moles, about 2 to 4 moles, about 4 to 12 moles, about 6 to 10 moles of ethylene oxide per mole of alcohol.

In some aspects, the at least one surfactant has an average of about 2 moles of ethylene oxide per mole of alcohol. In some aspects the at least one surfactant has an average of about 4 moles, about 6 moles, about 8 moles, about 10 moles, about 12 moles, about 14 moles, about 16 moles, about 18 moles, about 20 moles, or any value or range between any two of the preceding values, of ethylene oxide per mole of alcohol. In some aspects the at least one surfactant has an average of 3 moles of ethylene oxide per mole of alcohol. In some aspects the at least one surfactant has an average of about 7 moles of ethylene oxide per mole of alcohol.

In some aspects, the at least one surfactant is selected from an anionic surfactant, a cationic surfactant, a zwitterionic surfactant, a nonionic surfactant, or a combination thereof. In some aspects, the at least one surfactant is an anionic surfactant, a nonionic surfactant, or a combination thereof. In some aspects, the at least one surfactant is an anionic surfactant, a cationic surfactant, or a combination thereof. In some aspects, the at least one surfactant is a non-ionic surfactant, a cationic surfactant, or a combination thereof. In some aspects, the detergent composition comprises an anionic surfactant, a nonionic surfactant, or a combination of one or more of each.

The anionic surfactant comprises a hydrophobic tail group (e.g., a linear aliphatic chain) and an anionic hydrophilic head group. The hydrophobic tail group can be a $C_8$-$C_{18}$ aliphatic ("fatty") group that contains 0 or 1 double bond and can be optionally substituted with one or more (e.g., 1, 2, 3, or 4) substituents selected from an aryl group (e.g., phenyl, benzyl, naphthyl), alkyl, or fluoro (e.g., perfluorinated). The anionic hydrophilic group can be, for example, a sulfate ($—OSO_3^-$), sulfonate ($—SO_3^-$), a phosphate ($—OPO_3^{3-}$), a carboxylate ($—C(O)O^-$), or the conjugate base of an organic acid. In some aspects, polyethylene glycol repeat units designated as "ether" can be disposed between the hydrophobic tail group (e.g., a fatty group) and hydrophilic head group.

In some aspects, the anionic surfactant comprises an alkyl sulfate, an alkyl sulfonate, alkyl ether carboxylate, a fatty acid salt, a bile acid salt, a glutamic acid salt, a cholic acid salt, a carboxylic poly(ethylene glycol) ether, a taurate, or a combination thereof. Typically, the salt will be a Group I (e.g., lithium, sodium, potassium, etc.), Group II (e.g., magnesium, calcium, etc.), or ammonium salt.

Examples of an alkyl sulfate include, e.g., a fatty sulfate (e.g., octylsulfate, decyl sulfate, lauryl (dodecyl) sulfate, myristyl sulfate), dioctyl sodium sulfosuccinate, and an alkyl ether sulfate (also called an alcohol ethoxysulfate)). Other examples of fatty sulfate include, e.g., 3-sulfopropyl ethoxylate laurylphenyl ether and coco (coconut fatty acid) sulfate. Examples of an alkyl sulfonate include, e.g., a linear alkylbenzene sulfonate (e.g., sodium laurylbenzene sulfonate), a perfluoroalkyl sulfonate (e.g., perfluorooctyl sulfonate, perfluorobutyl sulfonate), and a methyl ester sulfonate. Examples of a fatty acid salt include, e.g., a caprylate, a laurate, a palmitate, a myristate, and a stearate. Other anionic surfactants include a bile acid salt, a glutamic acid salt (e.g., N-myristoyl-1-glutamic acid), a glycolic acid salt, a cholic acid salt, a carboxylic poly(ethylene glycol) ether (e.g., glycolic acid ethoxylate laurylphenyl ether, glycolic acid ethoxylate oleyl ether), a taurate (e.g., sodium oleic acid methyl taurate, sodium coconut fatty acid methyl taurate, sodium cocyl methyl taurate), or a combination thereof.

In some aspects, the anionic surfactant comprises an alkyl ether sulfate (AES). In general, the AES will have the structure $R^1—O\text{-}(EO)_nSO_3^-X^+$, in which $R^1$ is a $C_8$-$C_{18}$ alkyl group (linear or branched), EO is polyethoxylate, n is typically 2 to 10 (e.g., 2, 3, 4, 5, 6, 7, 8, 9, or 10), and $X^+$ is a cation that balances the charge of the sulfonate. The $C_8$-$C_{18}$ alkyl group is an alkyl comprising 8 to 18 carbons (e.g., 8 to 16 carbons, 10 to 18 carbons, 10 to 16 carbons, 12 to 18 carbons, 12 to 15 carbons, such as $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl, $C_{17}$ alkyl, or $C_{18}$ alkyl). In some aspects, the cation $X^+$ is a Group I cation, such as sodium cation or potassium cation, particularly sodium cation. In some aspects, the alkyl ether sulfate is sodium lauryl ether sulfate (SLES).

In some aspects, the detergent composition comprises sodium lauryl ether sulfate in an amount of about 1 wt. % to about 25 wt. %. In some aspects, the detergent composition comprises from about 1 wt. % to about 18 wt. %, about 1 wt. % to about 16 wt. %, about 1 wt. % to about 15 wt. %, about 2 wt. % to about 14 wt. %, from about 2 wt. % to about 12 wt. %, from about 2 wt. % to about 10 wt. %, from about 3 wt. % to about 8 wt. %, from about 4 wt. % to about 8 wt. %, from about 5 wt. % to about 7 wt. %, or any value or range between any two preceding values, of sodium lauryl ether sulfate.

In some aspects, the detergent composition comprises about 1 wt. %, about 2 wt. %, about 4 wt. %, about 6 wt. %, about 8 wt. %, about 10 wt. %, about 12 wt. %, about 15 wt. %, or any value or range between any two of the preceding values, of sodium lauryl ether sulfate. In some aspects, the detergent composition comprises about 6 wt. % sodium lauryl ether sulfate.

In some aspects, the composition comprises sodium lauryl ether sulfate having an average of about 2 to 20 moles of ethylene oxide per mole of alcohol. In some aspects, the at least one surfactant has an average of about 2 to 18 moles, about 2 to 16 moles, about 2 to 14 moles, about 2 to 12 moles, about 2 to 10 moles, about 2 to 8 moles, about 2 to 6 moles, about 2 to 4 moles, about 4 to 12 moles, about 6 to 10 moles, or any value or range between any two preceding values, of ethylene oxide per mole of alcohol.

In some aspects, the sodium lauryl ether sulfate has an average of about 2 moles of ethylene oxide per mole of alcohol. In some aspects the sodium lauryl ether sulfate has an average of about 4 moles, about 6 moles, about 8 moles, about 10 moles, about 12 moles, about 14 moles, about 16 moles, about 18 moles, about 20 moles, or any value or range between any two of the preceding values, of ethylene oxide per mole of alcohol. In some aspects the sodium lauryl ether sulfate has an average of 3 moles of ethylene oxide per mole of alcohol.

In some aspects, the alkyl chain of the sodium lauryl ether sulfate contains a $C_8$-$C_{18}$ chain. In some aspects, the alkyl chain of the sodium lauryl ether sulfate contains a $C_{10}$-$C_{18}$ chain, a $C_{10}$-$C_{16}$ chain, a $C_{12}$-$C_{20}$ chain, a $C_{12}$-Cis chain, or any value or range between any two preceding values. In some aspects, the alkyl chain of the sodium lauryl ether sulfate contains a $C_{12}$-$C_{15}$ chain.

In some aspects, the sodium lauryl ether sulfate comprises branching in an alkyl chain.

A nonionic surfactant comprises a hydrophobic tail group (e.g., a linear aliphatic chain) and an uncharged (i.e., neutral) hydrophilic head group. The hydrophobic tail group can be a $C_8$-$C_{18}$ aliphatic ("fatty") group that contains 0 or 1 double bond and can be optionally substituted with one or more (e.g., 1, 2, 3, or 4) substituents selected from an aryl group (e.g., phenyl, benzyl, naphthyl) or alkyl. The uncharged hydrophilic group can be, for example, an alkoxylate, such as ethoxylate ($(—CH_2CH_2O—)_n$; EO or PEO) or propoxylate ($(—CH(CH_3)CH_2O—)_m$; PO or PPO), in which n and m are the same or different and each is an integer of 1 to 100 (e.g., 1 to 90, 1 to 80, 1 to 70, 1 to 60, 1 to 50, 1 to 40, 1 to 30, 1 to 20, 1 to 15, 1 to 14, 1 to 13, to 13, 1 to 12, 1 to 11, 1 to 10, 1 to 9, 1 to 8, 1 to 7, 1 to 6, 1 to 5, or 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, or 100).

In some aspects, the nonionic surfactant comprises a fatty alcohol alkoxylate, a fatty acid alkoxylate, an alkyl phenol ethoxylate, an alkoxylated amine, an alkyl glucoside, a fatty amide alkoxylate, a diester of alkoxylated fatty acid, an alkoxylated methyl ester of fatty acid (e.g., a methyl ester ethoxylate), a glycerol fatty ester, castor oil alkoxylate, an ethylene oxide-propylene oxide block copolymer, a phenol alkoxylate, or a combination thereof.

Examples of a fatty alcohol alkoxylate include, e.g., $C_8$-$C_{18}$ ethoxylate and $C_8$-$C_{18}$ propoxylate. Examples of a fatty acid alkoxylate include, e.g., $R^1$—C(O)O-EO-H, in which $R^1$ is a $C_8$-$C_{18}$ alkyl group and EO is polyethylene oxide. Examples of an alkyl phenol ethoxylate include, e.g., $R^1$-phenyl-O(EO)—H, in which $R^1$ is a $C_8$-$C_{18}$ alkyl group and EO is polyethylene oxide. Examples of an alkoxylated amine include, e.g., ethoxylated $C_8$-$C_{18}$ alkylamine, tallow amine ethoxylate, lauryl amine ethoxylate ether, 2-2-(2-hydroxyethoxy)ethylaminoethanol, bis(hydroxyethoxy-ethyl)amine, 2,2'-((2-(2-hydroxyethoxy)ethyl)azanediyl)di-ethanol, and coco bis(2-hydroxyethyl) amine. Examples of an alkyl glucoside include, e.g., alkyl polyglucoside, such as $C_8$-$C_{18}$ polyglucoside which can include 1 to 3 glucoside units.

Examples of a fatty amide alkoxylate include $R^1$—C(O)NH-(EO)—H, in which $R^1$ is a $C_8$-$C_{18}$ alkyl group and EO is polyethylene oxide. Examples of a diester of alkoxylated fatty acid include, e.g., $R^1$—C(O)O-EO—C(O)—$R^{1'}$, in which $R^1$ and $R^{1'}$ is a $C_8$-$C_{18}$ alkyl group and EO is polyethylene oxide. Examples of an alkoxylated methyl ester of fatty acid (e.g., a methyl ester ethoxylate) include e.g., $R^1$—C(O)O-EO-$R^2$, in which $R^1$ is a $C_8$-$C_{18}$ alkyl group, $R^2$ is a $C_1$-$C_4$ alkyl group, and EO is polyethylene oxide. Examples of a glycerol fatty ester include, e.g., an ester formed from glycerol and a fatty acid (e.g., $C_8$-$C_{18}$ alkyl), such as 2-ethylhexyl oleate, glycerol trioleate, glyceryl monooleate, glyceryl monotallate, n-butyl stearate, neopentylglycol dioleate, pentaerythritol monooleate, pentaerythritol tetraoleate, and trimethylolpropane trioleate.

An example of a castor oil alkoxylate is polyethoxylated castor oil. Examples of an ethylene oxide-propylene oxide block copolymer include, e.g., $R^{30}$-$(EO)_n$—$(PO)_m$-$(EO)_n$—$R^4$, in which $R^3$ and $R^4$ are the same or different and each is a $C_1$-$C_7$ alkyl, a $C_5$-$C_6$ cycloalkyl, or an aryl; n is an integer of 30-150 (e.g., about 40-135, about 42-133), and m is an integer of about 10-100 (e.g., about 10-80, about 20-70, about 21-68) and block copolymers such as, PEO-PPO-PEO and PPO-PEO-PPO. Examples of a phenol alkoxylate include, e.g., $R^5$—$C_6H_4$-(EO)—H, wherein $R^5$ is hydrogen or a $C_1$-$C_{18}$ alkyl group, and EO is polyethylene oxide, such as octyphenol ethoxylate, nonylphenol ethoxylate, 2-phenoxydecan-1-ol, bisphenol ethoxylate, and a styrenated phenol ethoxylate (e.g., tristyrylphenol ethoxylate).

In some aspects, the nonionic surfactant comprises an alcohol ethoxylate as a nonionic surfactant of the formula $R^1$-$(EO)_n$—OH, wherein $R^1$ is a $C_{12}$-$C_{18}$ alkyl group, EO is ethoxylate, and n is an integer of moles from 1 to 15. In general, the alcohol ethoxylate will have a chemical structure of formula (I):

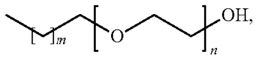

(I)

in which m is an integer of 10 to 16 (e.g., 10, 11, 12, 13, 14, 15, or 16) to form a $C_{12}$-$C_{18}$ fatty alkyl (e.g., $C_{12}$, $C_{13}$, $C_{14}$, $C_{15}$, $C_{16}$, $C_{17}$, and $C_{18}$), and n is an integer of 1 to 15 (e.g., 1, 2, 3, 4, 5, 6, 7, 8, 9, 10, 11, 12, 13, 14, or 15). The alcohol ethoxylate typically will contain a range of alkyl groups, such as $C_{12}$-$C_{15}$ or $C_{12}$-$C_{14}$ and can contain branches. In some aspects, the alcohol ethoxylate can contain 1 to 15 moles (e.g., 1 to 12 moles, 1 to 9 moles, 1 to 7 moles, or about 7 moles) of ethoxylate per mole of alcohol. In some aspects, the alcohol ethoxylate can be a $C_{12}$-$C_{18}$ alcohol ethoxylate with 1-15 moles of ethoxylate. In some aspects, the alcohol ethoxylate comprises a $C_{12}$-$C_{15}$ alcohol ethoxylate with 7 moles of ethoxylate. In some aspects, the alcohol ethoxylate comprises ethoxylated lauryl alcohol.

In some aspects, the composition comprises alcohol ethoxylate in an amount of about 0.1 wt. % to about 40 wt. %. In some aspects, provided herein is a detergent composition comprising from about 1 wt. % to about 40 wt. %, from about 2 wt. % to about 40 wt. %, from about 4 wt. % to about 35 wt. %, from about 6 wt. % to about 35 wt. %, from about 8 wt. % to about 30 wt. %, from about 10 wt. % to about 30 wt. %, 1 wt. % to about 20 wt. %, from about 2 wt. % to about 20 wt. %, from about 4 wt. % to about 20 wt. %, from about 6 wt. % to about 20 wt. %, from about 8 wt. % to about 20 wt. %, from about 10 wt. % to about 20 wt. %, from about 2 wt. % to about 18 wt. %, from about 4 wt. % to about 16 wt. %, from about 6 wt. % to about 16 wt. %, from about 8 wt. % to about 16 wt. %, from about 8 wt. % to about 14 wt. %, from about 10 wt. % to about 14 wt. %, or any value or range between any two preceding values, of alcohol ethoxylates. In some aspects, the detergent composition comprises about 0.1 wt. % to about 20 wt. % alcohol ethoxylates.

In some aspects, the composition comprises about 0.1 wt. %, about 1 wt. %, about 2 wt. %, about 4 wt. %, about 6 wt. %, about 8 wt. %, about 10 wt. %, about 12 wt. %, about 14 wt. %, about 16 wt. %, about 18 wt. %, about 20 wt. %, about 25 wt. %, about 30 wt. %, about 350 wt. %, about 40 wt. %, or any value or range between any two of the preceding values of alcohol ethoxylates. In some aspects, the detergent composition comprises about 12 wt. % alcohol ethoxylates.

In some aspects, the alkyl chain of the alcohol ethoxylate contains a $C_8$-$C_{18}$ chain. In some aspects, the alkyl chain of the alcohol ethoxylate contains a $C_{10}$-$C_{18}$ chain, a $C_{10}$-$C_{16}$ chain, a $C_{12}$-$C_{20}$ chain, a $C_{12}$-Cis chain, or any value or range between any two preceding values. In some aspects, the alkyl chain of the alcohol ethoxylate contains a $C_{12}$-$C_{15}$ chain.

In some aspects, the alcohol ethoxylate comprises branching in an alkyl chain.

In some aspects, provided herein is a detergent composition comprising an alcohol ethoxylate having an average of about 2 to 20 moles of ethylene oxide per mole of alcohol. In some aspects, the alcohol ethoxylate has an average of about 2 to 18 moles, about 2 to 16 moles, about 2 to 14 moles, about 2 to 12 moles, about 2 to 10 moles, about 2 to 8 moles, about 2 to 6 moles, about 2 to 4 moles, about 4 to 12 moles, about 6 to 10 moles, or any value or range between any two preceding values, of ethylene oxide per mole of alcohol.

In some aspects, the alcohol ethoxylate has an average of about 2 moles of ethylene oxide per mole of alcohol. In some aspects the alcohol ethoxylate has an average of about 4 moles, about 6 moles, about 8 moles, about 10 moles, about 12 moles, about 14 moles, about 16 moles, about 18 moles, about 20 moles, or any value or range between any two of the preceding values of ethylene oxide per mole of alcohol. In some aspects the alcohol ethoxylate has an average of 7 moles of ethylene oxide per mole of alcohol.

A cationic surfactant comprises a hydrophobic tail group (e.g., a linear aliphatic chain) and a cationic hydrophilic head group. The hydrophobic tail group can be a $C_8$-$C_{18}$ aliphatic ("fatty") group that contains 0 or 1 double bond and can be optionally substituted with one or more (e.g., 1, 2, 3, or 4) substituents selected from an aryl group (e.g., phenyl, benzyl, naphthyl) or alkyl. The cationic hydrophilic group can be, for example, an amino group that can be quaternized, such as trialkylammonium. The counterion can be any suitable anion that can balance the charge. In some aspects, the counterion is an anion with a −1 charge (e.g., $X^-$), such as a halide (e.g., chloride, bromide, etc.), hydroxy, or tosylate.

In some aspects, the cationic surfactant can be alkoxylated, in which polyalkylene glycol (e.g., polyethylene glycol, polypropylene glycol) repeat units can be disposed between the hydrophobic tail group (e.g., a fatty group) and hydrophilic head group.

In some aspects, the cationic surfactant can be a fatty amine salt or a quaternary ammonium compound. In some aspects, the cationic surfactant comprises a fatty amine salt, a fatty diamine salt, a coco amine alkoxylate, an alkoxylated amine, an alkoxylated diamine, fatty quaternary ammonium compound, a fatty amide quaternary ammonium compound, an alkoxylated quaternary ammonium compound, a benzalkyl quaternary ammonium compound, or a combination thereof.

Examples of the fatty amine salt include, e.g., a $C_8$-$C_{18}$ fatty amine salt (e.g., $R^1$—$NH_3^+$, in which $R^1$ is a $C_8$-$C_{18}$ alkyl group). Examples of a fatty diamine salt include, e.g., $R^1$—$NH_2^+$—$R^2$—$NH_3^+$, in which $R^1$ is a $C_8$-$C_{18}$ alkyl group and $R^2$ is a $C_{1-6}$ alkyl). Examples of an alkoxylated amine and an alkoxylated diamine include a polyethoxylated fatty amine and diamine, respectively.

Examples of a fatty quaternary ammonium compound include, e.g., $R^1$—$NR^3{}_{3^+}$, in which $R^1$ is a $C_8$-$C_{18}$ alkyl group and each $R^3$ is a $C_{1-4}$ alkyl, phenyl, or benzyl (e.g., alkyltrimethylammonium halide, alkyltrimethylammonium tosylate, alkyltrimethylammonium hydroxide). Examples of a fatty amide quaternary ammonium compound include, e.g., $R^1$—C(O)N—$R^2$—$NR^3{}_{3^+}$, in which $R^1$ is a $C_8$-$C_{18}$ alkyl group, $R^2$ is a $C_1$-6 alkyl, and each $R^3$ is a $C_{1-4}$ alkyl, phenyl, or benzyl (e.g., trimethylammonium stearamide). Examples of an alkoxylated quaternary ammonium compound include, e.g., a polyethoxylated quaternary ammonium compound. Examples of a benzalkyl quaternary ammonium compound include, e.g., benzyl-$C_8$-$C_{18}$ alkyldimethylammonium (e.g., benzalkonium chloride).

The zwitterionic surfactant is amphoteric and comprises a hydrophobic tail group (e.g., a linear aliphatic chain) and a hydrophilic head group with both a cationic charge and an anionic charge. The hydrophobic tail group can be a $C_8$-$C_{18}$ aliphatic ("fatty") group that contains 0 or 1 double bond and can be optionally substituted with one or more (e.g., 1, 2, 3, or 4) substituents selected from an aryl group (e.g., phenyl, benzyl, naphthyl) or alkyl. The cationic moiety can be, for example, a quaternary ammonium group, such as dialkylammonium or trialkylammonium (e.g., $C_1$-$C_4$ alkyl, such as methyl). The anionic moiety can be, for example, oxo ($O^-$), a sulfate (—$OSO_3^-$), sulfonate (—$SO_3^-$), a phosphate (—$OPO_3^{3-}$), a carboxylate (—C(O)$O^-$), or the conjugate base of an organic acid.

In some aspects, the zwitterionic surfactant comprises a betaine, a sulfonated quaternary ammonium compound, a phosphonated quaternary ammonium compound, a trialkylamine N-oxide, or a combination thereof.

Examples of a betaine include, e.g., $C_8$-$C_{18}$ alkyl betaine, cocobetaine, cocamidopropyl betaine, amidosulfobetaine-16, hexadecyl hydroxypropyl sulfobetaine, lauryl-N,N-(dimethylammonio)butyrate, and lauryl-N,N-(dimethyl)-glycinebetaine. Examples of a sulfonated quaternary ammonium compound include, e.g., 3-(N,N-dimethyl-octylammonio)propanesulfonate, 4-(N,N-dimethyl-dodecylammonio)butanesulfonate, 3-{N,N-dimethyl-N-[3-(4-octylbenzoylamino)propyl]ammonio} propanesulfonate, 3-[(3-cholamidopropyl)dimethylammonio]-1-propanesulfonate, 3-([3-cholamidopropyl] dimethylammonio)-2-hydroxy-1-propanesulfonate, coco(amidopropyl)dimethylammonio-2-hydroxypropanesulonate, lauryl-N,N-(dimethylammonio) butyrate, lauryl-N,N-(dimethyl)-propanesulfonate, 3-(4-tert-butyl-1-pyridinio)-1-propanesulfonate, 3-(1-pyridinio)-1-propanesulfonate, and 3-(benzyl-dimethylammonio) propanesulfonate. Examples of a phosphonated quaternary ammonium compound include, e.g., a phosphocholine, such as N-dodecylphosphocholine and hexadecyl phosphocholine. Examples of a trialkylamine N-oxide include, e.g., $R^1$—N($O^-$)$R^{22}$, in which $R^1$ is a $C_8$-$C_{18}$ alkyl group, $R^2$ is a $C_{1-4}$ alkyl, such as lauryldimethylamine N-oxide and 4-ethyl-N,N-2-trimethyloctan-1-amine oxide.

In some aspects, the at least one surfactant is selected from an alcohol ethoxylate, an alkyl ether sulfate, and an alkyl ether carboxylate.

In some aspects, the at least one surfactant is sodium lauryl ether sulfate (SLES), an alcohol ethoxylate, or combinations thereof.

In some aspects, the detergent composition comprises an alkaline salt formed using a cation selected from sodium, calcium, potassium, or magnesium paired with an anion selected from chloride, carbonate, bicarbonate, hydroxide, acetate, sulfate, bisulfate, or phosphate. In some aspects, the detergent composition comprises an alkaline salt selected from sodium carbonate, sodium bicarbonate, sodium chloride, calcium chloride, sodium acetate, or sodium hydroxide.

In some aspects, the detergent composition comprises an enzyme to aid in removing stains, including protein stains, oil stains, tannin stains, starch stains, and dyes. For example, a protease is capable of breaking down protein-based stains, such as sweat, blood, mud, and dairy products. An amylase is capable of breaking down a starch-based stain, such as cornstarch or potato starch. A lipase is capable of breaking down fats. A mannanase is capable of breaking down guar and locust bean stains. In some aspects, the at least one enzyme is a hydrolytic enzyme. The at least one enzyme can comprise a protease, an amylase, a mannanase, a lactase, a lipase, a perhydrolase, an oxidoreductase, an endocellulase, an exocellulase, or a combination thereof. In some aspects, the detergent composition comprises a protease, an amylase, a lipase, a mannanase, or a combination thereof. In some aspects, the detergent composition comprises enzymes selected from proteases, amylases, lipases, and mannanases.

In some aspects, the detergent composition comprises a total from about 0.01 wt % to about 10 wt % of at least one enzyme (e.g., a protease, an amylase, a lipase, a mannanase, or a combination thereof) relative to the total weight of the composition. For example, the total enzyme content can from about 0.01 wt % to about 4 wt %, about 0.01 wt % to about 3 wt %, about 0.01 wt % to about 2 wt %, about 0.01 wt % to about 1 wt %, about 0.05 wt % to about 5 wt %, about 0.05 wt % to about 4 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.5 wt % to about 5 wt %, about 0.5 wt % to about 3 wt %, about 0.5 wt % to about 2 wt %, about 0.5 wt % to about 1 wt %, about 1 wt % to about 5 wt %, about 1 wt % to about 4 wt %, about 1 wt % to about 3 wt %, about 1 wt % to about 2 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3 wt %, about 3.1 wt %, about 3.2 wt %, about 3.3 wt %, about 3.4 wt %, about 3.5 wt %, about 3.6 wt %, about 3.7 wt %, about 3.8 wt %, about 3.9 wt %, about 4 wt %, about 4.2 wt %, about 4.5 wt %, about 4.8 wt %, about 5 wt %, about 6 wt %, about 7 wt %, about 8 wt %, about 9 wt %, about 10 wt %, or any value or range between any two of the preceding values of the total weight of the composition.

In one aspect, the composition comprises at least one additive selected from surfactants, soaps, alkalinity agents, buffers, chelating agents, builders, preservatives, polymers, enzymes, fragrances, dyes, and any combination thereof.

In some aspects, the detergent composition comprises from about 1 wt % to about 20 wt % of a total amount of additives relative to the total weight of the composition. For example, the total amount of additives can be from about 1 wt % to about 19 wt %, 1 wt % to about 18 wt %, about 1 wt % to about 17 wt %, about 1 wt % to about 16 wt %, about 1 wt % to about 15 wt %, 1 wt % to about 12 wt %, about 1 wt % to about 10 wt %, about 1 wt % to about 8 wt %, about 1 wt % to about 5 wt %, about 1 wt % to about 3 wt %, about 1.5 wt % to about 15 wt %, about 1.5 wt % to about 12 wt %, about 1.5 wt % to about 10 wt %, about 1.5 wt % to about 8 wt %, about 1.5 wt % to about 5 wt %, about 1.5 wt % to about 3 wt %, about 2 wt % to about 15 wt %, about 2 wt % to about 12 wt %, about 2 wt % to about 10 wt %, about 2 wt % to about 8 wt %, about 2 wt % to about 5 wt %, about 2 wt % to about 3 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, about 10 wt %, about 10.5 wt %, about 11 wt %, about 11.5 wt %, about 12 wt %, about 12.5 wt %, about 13 wt %, about 13.5 wt %, about 14 wt %, about 14.5 wt %, about 15 wt %, about 16 wt %, about 16.5 wt %, about 17 wt %, about 17.5 wt %, about 18 wt %, about 18.5 wt %, about 19 wt %, about 19.5 wt %, about 20 wt %, or any value or range between any two of the preceding values of the total weight of the composition.

In some aspects, the at least one additive is derived from petroleum, plants, or other biobased sources.

In some aspects, the at least one additive is a petroleum derived surfactant. In some aspects, the at least one petroleum derived surfactant is an anionic surfactant, a cationic surfactant, a zwitterionic surfactant, a nonionic surfactant, or a combination thereof. In some aspects, the at least one (e.g., 1, 2, 3, 4, 5, or 6, etc.) petroleum derived surfactant is an anionic surfactant, a cationic surfactant, a zwitterionic surfactant, a nonionic surfactant, or a combination thereof. For example, the detergent composition can comprise a combination of an anionic, a nonionic surfactant, or a combination of one or more thereof, derived from petroleum. In some aspects, the petroleum derived surfactant is selected from a linear alkyl benzene sulfonate, a lauramine oxide, a cocamidopropylbetaine, a sodium lauryl sulfate and combinations thereof.

In some aspects, the detergent composition comprises a soap. In some aspects, the detergent composition comprises one or more soaps. In some aspects, the soap is a sodium or potassium salt of a natural oil or fatty acid. In some aspects, the fatty acid soap is selected from butyric/caproic acid, caprylic acid, capric acid, lauric acid, myristic acid, lauric/myristic acid, palmitic acid, stearic acid, oleic acid, ricinoleic acid, behenic/eurucic acid, coconut fatty acid, and combinations thereof. In one aspect, the soap is coconut fatty acid.

In some aspects, the detergent composition can have a pH of about 6.5 to about 12 (e.g., about 7 to about 12, about 7.5 to 12, about 8 to about 12, about 8.5 to 12, about 9 to about 12, about 9.5 to about 12, about 10 to about 12, about 10.5 to about 12, about 11 to about 12, about 11.5 to about 12, about 6.5 to about 11, about 7 to about 11, about 7.5 to about 11, about 8 to about 11, about 8.5 to about 11, about 9 to about 11, about 9.5 to about 11, about 10 to about 11, about 6.5 to about 10, about 7 to about 10, about 7.5 to about 10, about 8 to about 10, about 8.5 to about 10, about 9 to about 10, about 9.5 to about 10, about 6.5 to about 9, about 7 to about 9, about 7.5 to about 9, about 8 to about 9, about 8.5 to about 9). In some aspects, the detergent composition has a pH of greater than 7 (e.g., about 7.1, about 7.2, about 7.3, about 7.4, about 7.5, about 7.6, about 7.7, about 7.8, or about 7.9) or greater. In some aspects, the detergent composition has a pH of about 8 to about 9. In some aspects, the detergent composition has a pH of about 7.1, about 7.2, about 7.3, about 7.4, about 7.5, about 7.6, about 7.7, about 7.8, about 7.9, about 8, about 8.1, about 8.2, about 8.3, about 8.4, about 8.5, about 8.6, about 8.7, about 8.8, about 8.9, about 9, about 9.1, about 9.2, about 9.3, about 9.4, about 9.5, about 9.6, about 9.7, about 9.8, about 9.9, about 10, about 10.1, about 10.2, about 10.3, about 10.4, about 10.5, about 10.6, about 10.7, about 10.8, about 10.9, about 11.1, about 11.2, about 11.3, about 11.4, about 11.5, about 11.6, about 11.7, about 11.8, about 11.9, about 12, or any value or range between any two of the preceding values. In some aspects, the detergent composition has a pH of about 7 to about 8.

In some aspects, the detergent composition comprises a base to adjust the pH. The base can be any suitable compound with a pKb of about 1 to about 13. In some aspects, the base can be a Group I hydroxide, a Group II hydroxide, monoethanolamine, diethanolamine, triethanolamine, methyl diethanolamine, sodium tetraborate, trisodium phosphate, sodium carbonate, or a combination thereof. In other aspects, the base is a Group I hydroxide, a Group II hydroxide, sodium tetraborate, trisodium phosphate, sodium carbonate, or a combination thereof. In some aspects, the base can be a monoethanolamine, sodium carbonate, or Group I hydroxide (e.g., sodium hydroxide, potassium hydroxide, or a combination of both). In some aspects, the detergent composition comprises sodium carbonate.

To help maintain the pH, in some aspects, the composition can further comprise an acid, which is any suitable compound with a pKa of less than about 10. In some aspects, the acid is an inorganic acid or an organic acid. Examples of an inorganic acid include hydrochloric acid, nitric acid, nitrous acid, sulfuric acid, sulfurous acid, phosphoric acid, boric acid, hydrobromic acid, hydroiodic acid, perchloric acid, and combinations thereof. In some aspects, the acid is a weak acid such that the acid has a pKa of 2 or greater (e.g., pKa is about 2 to about 10). Examples of a weak acid include, e.g., an organic acid or carbonic acid, hydrocyanic acid, phosphoric acid, sulfurous acid, nitrous acid, or a combination thereof.

In some aspects, the acid in the detergent composition is an organic acid, which in some instances can additionally act as a chelating agent. The organic acid can contain one or more (e.g., 1, 2, or 3) carboxylic acid groups, which can be used singly or in combination. For example, monocarboxylic acids include formic acid, acetic acid, propionic acid, butanoic acid, quinic acid, shikimic acid, lactic acid, sorbic acid, caproic acid, capyrylic acid, capric acid, lauric acid, and stearic acid. Di- and tricarboxylic acids include citric acid, isocitric acid, cis-aconitic acid, adipic acid, gluconic acid, glutaric acid, itaconic acid, ascorbic acid, succinic acid, malonic acid, malic acid, maleic acid, fumaric acid, tartaric acid, and oxalic acid. In some aspects, the detergent composition comprises citric acid.

In some aspects, the detergent composition comprises a performance polymer that improves at least one aspect of a washed textile. In some aspects, the performance polymer improves the cleaning action of the detergent composition, removes or reduces stains, maintains whiteness, protects color, protects the integrity of a textile, provides odor control, or any combination thereof. In some aspects the performance polymer comprises polyethyleneimine ethoxylate, polyethyleneimine ethoxylate propoxylate, a polycarboxylate (e.g., an acrylic homopolymer or copolymer), carboxymethylcellulose, a polyester, polyvinyl pyrrolidone, a copolymer comprising terephthalic acid, a copolymer comprising maleic acid, a copolymer comprising acrylamino tertiary butyl sulfonate, or any combination thereof. In some aspects the performance polymer comprises polyethyleneimine ethoxylate, polyethyleneimine ethoxylate propoxylate, or a combination of both.

In some aspects, the detergent composition comprises an anti-redeposition agent that keeps dissolved soil stains stable in the wash water and prevent the stains from redepositing on a textile. In some aspects, the anti-redeposition polymer is biodegradable. The anti-redeposition polymer can be based on acrylic acid, e.g., a homopolymer of acrylic acid, a polycarboxylate based on acrylic acid, a copolymer of acrylic acid and polystyrene, or a copolymer of maleic acid and acrylic acid. Examples of a suitable anti-redeposition polymer include, e.g., sodium polyacrylate, modified polyethylene glycol, styrene-acrylic acid copolymer, polyethyleneimine, or a combination thereof. In some aspects, the anti-redeposition polymer comprises sodium polyacrylate.

In some aspects, the detergent composition comprises from about 0.001 wt % to about 5 wt % of an anti-redeposition polymer relative to the total weight of the composition. For example, the anti-redeposition polymer can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, about 5 wt %, or any value or range between any two of the preceding values of the total weight of the composition.

In some aspects, the detergent composition comprises a chelating agent (i.e., a chelant) that serves to improve the cleaning action of the detergent by scavenging metal ions naturally found in water. Suitable examples of a chelating agent includes, e.g., citric acid, nitriloacetic acid, sodium tripolyphosphate, ethylenediaminetetraacetic acid, diethylenetriaminepentaacetic acid, tetrasodium glutamate diacetate, tetrasodium aspartate diacetate, tetrasodium iminodisuccinate, and combinations thereof. In some aspects, the detergent composition comprises tetrasodium iminodisuccinate.

In some aspects, the detergent composition comprises from about 0.001 wt % to about 5 wt % of a chelating agent relative to the total weight of the composition. For example, the chelating agent can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, about 5 wt %, or any value or range between any two of the preceding values of the total weight of the composition.

In some aspects, the detergent composition comprises a preservative. The detergent can contain any preservatives customary in detergents. In some aspects, the detergent composition comprises active compounds from the groups of alcohols, aldehydes, antimicrobial acids or salts thereof, carboxylic acid esters, acid amides, phenols, phenol derivatives, diphenyls, diphenylalkanes, urea derivatives, oxygen and nitrogen acetals and formals, benzamidines, isothiazoles and their derivatives, such as isothiazolinones, phthalimide derivatives, pyridine derivatives, surface-active compounds, guanidines, antimicrobial amphoteric compounds, quinolines, 1,2-dibromo-2,4-dicyanobutane, iodo-2-propynyl-butyl-carbamate, iodine, iodophores and peroxides.

In some aspects, the detergent composition comprises a defoamer that helps maintain the rise of foam, which can, in some aspects, avoid high foaming or water spilling from a washing machine. In general, the defoamer has a low viscosity. In some aspects the defoamer comprises coconut fatty acid, a silicone, ethylene-bis-stearamide, a fatty acid, a fatty alcohol, or any combination thereof.

In some aspects, the detergent composition comprises an optical brightener (e.g., a fluorescent whitening agent), which is any suitable hydrophilic compound that absorbs ultra violet light and emits visible (e.g., blue-violet) light to make textiles appear brighter. The optical brightener can comprise a triazole, a stilbene, or a biphenyl group. Examples of the optical brightener include, e.g., 2,2'-(2,5-thienediyl)bis[5-(2-methyl-2-propanyl)-1,3-benzoxazole, 5,5'-((perfluorocyclopent-1-ene-1,2-diyl)bis(5-methylthiophene-4,2-diyl))bis(2-(6-methoxybenzo[d]thiazol-2-yl)-1,3,4-oxadiazole), 5,5'-((perfluorocyclopent-1-ene-1,2-diyl)bis(5-methylthiophene-4,2-diyl))bis(2-(6-methoxybenzo[d]thiazol-2-yl)-1,3,4-oxadiazole), 2',7'-bis(5-(4-(tert-butyl)phenyl)-1,3,4-oxadiazol-2-yl)-$N^3$,$N^3$,$N^6$,$N^6$-tetraphenyl-9,9'-spirobi[fluorene]-3,6-diamine, N,N-diphenyl-4-(5-(4-(triphenylsilyl)phenyl)-1,3,4-oxadiazol-2-yl)aniline, ((4-((4-(5-(4-nitrophenyl)-1,3,4-oxadiazol-2-yl)phenyl)diazenyl) phenyl)azanediyl)bis(ethane-2,1-diyl) diacetate, ((4-((4-(5-(4-((E)-4-nitrostyryl)phenyl)-1,3,4-oxadiazol-2-yl)phenyl)diazenyl)phenyl)azanediyl)bis(ethane-2,1-diyl) diacetate, 4,4'-diamino-2,2'-stilbenedisulfonic acid, 4,4'-bis(benzoxazolyl)-cis-stilbene, and 2,5-bis(benzoxazol-2-yl)thiophene, and combinations thereof. In some aspects, the optical brightener can be 2,2'-(2,5-thienediyl)bis[5-(2-methyl-2-propanyl)-1,3-benzoxazole.

In some aspects, the detergent composition can comprise a bitterant (e.g., a bittering agent), which is any suitable compound that imparts a bitter taste to the composition. The bitterant can be added to avoid accidental poisoning. Examples of the bitterant include, e.g., denatonium benzoate, sucrose octaacetate, quercetin, brucine, quassin, and combinations thereof. In an aspect, the bitterant can be denatonium benzoate.

In some aspects, the detergent composition comprises a corrosion inhibitor (e.g., an oxygen scavenger), which is any suitable compound that lowers the dissolved oxygen content in the washing medium by reacting with oxygen. The corrosion inhibitor can, for example, protect the inside of a washing machine from rusting. Examples of the corrosion inhibitor include, e.g., an inorganic corrosion inhibitor (e.g., a sulfite, a silicate, a polyphosphate, calcium hydroxide), an organic corrosion inhibitor (e.g., calcium hydrogen carbonate, a sulfonate, a phosphonate, a $C_{12}$-$C_{15}$ alcohol ether phosphate), or a combination thereof. In an aspect, the corrosion inhibitor can be sodium sulfite.

In some aspects, the detergent composition comprises a soap, a sodium carbonate, builder, a preservative, a cleaning polymer, or any combination thereof.

Beauty Compositions

Body Wash and Hand Soap

In one aspect, the present disclosure provides a body wash detergent composition comprising at least one surfactant; optionally, at least one additive; and water.

In some aspects, the present disclosure provides a body wash detergent composition comprising at least one surfactant wherein at least 20% of the carbon content of the surfactant is derived from bio-content and accounted for using a mass balanced allocation method; optionally, at least one additive selected from surfactants, alkalinity agents, buffers, chelating agents, builders, non-aqueous solvents, preservatives, polymers, fragrances, dyes, and any combination thereof; and water.

In one aspect, the present disclosure provides a hand soap detergent composition comprising at least one surfactant; optionally, at least one additive; and water.

In some aspects, the present disclosure provides a hand soap detergent composition comprising at least one surfactant wherein at least 20% of the carbon content of the surfactant is derived from bio-content and accounted for using a mass balanced allocation method; optionally, at least one additive selected from surfactants, alkalinity agents, buffers, chelating agents, builders, non-aqueous solvents, preservatives, polymers, fragrances, dyes, and any combination thereof; and water.

In some aspects, at least 10% of the carbon content of the at least one surfactant is derived from bio-content and accounted for using a mass balanced allocation method. In some aspects, at least 15% of the carbon content of the at least one surfactant is derived from bio-content and accounted for using a mass balanced allocation method. In some aspects, at least 20% of the carbon content of the at least one surfactant is derived from bio-content and accounted for using a mass balanced allocation method. In some aspects at least 25%, at least 30%, at least 35%, at least 40%, at least 45%, and least 50%, at least 55%, at least 60%, at least 70%, at least 80%, at least 90%, at least 100%, or any range or value between any two preceding values, of the carbon content of the at least one surfactant is derived from bio-content and accounted for using a mass balanced allocation method.

In some aspects, the at least one surfactant comprises an alkyl chain and at least two ethoxylate units.

In some aspects, the alkyl chain of the at least one surfactant contains a $C_8$-$C_{20}$ chain. In some aspects, the alkyl chain of the at least one surfactant contains a $C_8$-$C_{18}$ chain, a $C_{10}$-$C_{18}$ chain, a $C_{10}$-$C_{16}$ chain, a $C_{12}$-Cis chain, a $C_{12}$-$C_{20}$ chain, or a value range between any two preceding values. In some aspects, the alkyl chain of the at least one surfactant contains a $C_{12}$-$C_{15}$ chain.

In some aspects, the at least one surfactant comprises branching in an alkyl chain.

In some aspects, provided herein is a hand soap and/or body wash detergent composition comprising at least one surfactant having an average of about 2 to 20 moles of ethylene oxide per mole of alcohol. In some aspects, the at least one surfactant has an average of about 2 to 18 moles, about 2 to 16 moles, about 2 to 14 moles, about 2 to 12 moles, about 2 to 10 moles, about 2 to 8 moles, about 2 to 6 moles, about 2 to 4 moles, about 4 to 12 moles, about 6 to 10 moles of ethylene oxide per mole of alcohol.

In some aspects, the at least one surfactant has an average of about 2 moles of ethylene oxide per mole of alcohol. In some aspects the at least one surfactant has an average of about 4 moles, about 6 moles, about 8 moles, about 10 moles, about 12 moles, about 14 moles, about 16 moles, about 18 moles, about 20 moles, or any value or range between any two of the preceding values, of ethylene oxide per mole of alcohol. In some aspects the at least one surfactant has an average of 3 moles of ethylene oxide per mole of alcohol. In some aspects the at least one surfactant has an average of about 7 moles of ethylene oxide per mole of alcohol.

In some aspects, the hand soap and/or body wash detergent composition comprises any one of the surfactants described herein. In some aspects, the at least one surfactant is selected from an anionic surfactant, a cationic surfactant, a zwitterionic surfactant, a nonionic surfactant, or a combination thereof. In some aspects, the at least one surfactant is an anionic surfactant, a nonionic surfactant, or a combination thereof. In some aspects, the at least one surfactant is an anionic surfactant, a cationic surfactant, or a combination thereof. In some aspects, the at least one surfactant is a non-ionic surfactant, a cationic surfactant, or a combination thereof. In some aspects, the hand soap and/or body wash detergent composition comprises an anionic surfactant, a nonionic surfactant, or a combination of one or more of each.

In some aspects, the anionic surfactant comprises a $C_8$-$C_{18}$ aliphatic ("fatty") group that contains 0 or 1 double bonds and can be optionally substituted with one or more (e.g., 1, 2, 3, or 4) substituents selected from an aryl group (e.g., phenyl, benzyl, naphthyl), alkyl, or fluoro (e.g., perfluorinated). The anionic hydrophilic group can be, for example, a sulfate ($—OSO_3^-$), sulfonate ($—SO_3^-$), a phosphate ($—OPO_3^{3-}$), a carboxylate ($—C(O)O^-$), or the conjugate base of an organic acid. In some aspects, the anionic surfactant comprises polyethylene glycol repeat units designated as "ether" between a hydrophobic tail group (e.g., a fatty group) and a hydrophilic head group.

In some aspects, the anionic surfactant comprises an alkyl sulfate, an alkyl sulfonate, alkyl ether carboxylate, a fatty acid salt, a bile acid salt, a glutamic acid salt, a cholic acid salt, a carboxylic poly(ethylene glycol) ether, a taurate, or a combination thereof. Typically, the salt will be a Group I (e.g., lithium, sodium, potassium, etc.), Group II (e.g., magnesium, calcium, etc.), or ammonium salt.

Examples of an alkyl sulfates include a fatty sulfate (e.g., octylsulfate, decyl sulfate, lauryl (dodecyl) sulfate, myristyl sulfate), dioctyl sodium sulfosuccinate, and an alkyl ether sulfate (also called an alcohol ethoxysulfate)). Other examples of fatty sulfates include, e.g., 3-sulfopropyl ethoxylate laurylphenyl ether and coco (coconut fatty acid) sulfate. Examples of an alkyl sulfonate include, e.g., a linear alkylbenzene sulfonate (e.g., sodium laurylbenzene sulfonate), a perfluoroalkyl sulfonate (e.g., perfluorooctyl sulfonate, perfluorobutyl sulfonate), and a methyl ester sulfonate. Examples of a fatty acid salt include, e.g., a caprylate, a laurate, a palmitate, a myristate, and a stearate. Other anionic surfactants include a bile acid salt, a glutamic acid salt (e.g., N-myristoyl-1-glutamic acid), a glycolic acid salt, a cholic acid salt, a carboxylic poly(ethylene glycol) ether (e.g., glycolic acid ethoxylate laurylphenyl ether, glycolic acid ethoxylate oleyl ether), a taurate (e.g., sodium oleic acid methyl taurate, sodium coconut fatty acid methyl taurate, sodium cocyl methyl taurate), or a combination thereof.

In some aspects, the anionic surfactant comprises an alkyl ether sulfate (AES) as described herein. In some aspects, the alkyl ether sulfate is sodium lauryl ether sulfate (SLES). In some aspects, the alkyl ether sulfate is sodium lauryl ether sulfate (SLES) comprising 2 to 3 moles ethylene oxide (EO).

In some aspects, the hand soap and/or body wash detergent composition comprises a nonionic surfactant. In some aspects, the nonionic surfactant is lauramine oxide. In some aspects the nonionic surfactant is lauramido propylamine oxide.

In some aspects, the hand soap and/or body wash detergent composition comprises a zwitterionic surfactant. In some aspects, the zwitterionic surfactant is cocamido propyl betaine.

In some aspects, the hand soap and/or body wash detergent composition comprises any one of the additives described herein. In one aspect, the composition comprises at least one additive selected from surfactants, alkalinity agents, buffers, chelating agents, builders, non-aqueous solvents, preservatives, polymers, fragrances, dyes, and any combination thereof.

In some aspects, the at least one additive is derived from petroleum, plants, or other biobased sources.

In some aspects, the at least one additive is a petroleum derived surfactant as described herein. For example, the hand soap and/or body wash detergent composition can comprise a combination of an anionic surfactant, a nonionic surfactant, zwitterionic surfactant, or a combination of one or more thereof, derived from petroleum. In some aspects, the petroleum derived surfactant is selected from a linear alkyl benzene sulfonate, a lauramine oxide, a cocamidopropylbetaine, a sodium lauryl sulfate and combinations thereof.

In some aspects, the hand soap and/or body wash detergent composition comprises an alkaline salt as described herein. In some embodiments the hand soap detergent composition comprises sodium chloride.

In some aspects, the composition can further comprise an acid as described herein.

In some aspects, the acid in the hand soap and/or body wash detergent composition is an organic acid as described herein. In some aspects, the hand soap detergent composition comprises citric acid. In some aspects, the body wash detergent composition comprises lactic acid.

In some aspects, the hand soap and/or body wash detergent composition comprises a chelating agent as described herein. In some aspects, the hand soap detergent composition comprises tetrasodium iminodisuccinate. In some aspects, the hand soap detergent composition comprises tetrasodium ethylenediaminetetraacetic acid (EDTA).

In some aspects, the hand soap and/or body wash detergent composition comprises a non-aqueous solvent that is selected from ethylene glycol, diethylene glycol, triethylene glycol, diethylene glycol monobutyl ether, propylene glycol, dipropylene glycol, tripropylene glycol, dipropylene glycol monobutyl ether, 1,3-butylene glycol, 1,4-butylene glycol, 1-(1-butoxy-2-propoxy)-2-propanol, 2-methyl-2,4-pentanediol, 1,5-pentanediol, 1,6-hexanediol, polyethylene glycol, glycerin, ethanol, or a combination thereof.

In some aspects, the hand soap and/or body wash detergent composition comprises a preservative as described herein.

In some aspects, the hand soap detergent composition comprises water, a surfactant derived from bio-content and accounted for using a mass balanced allocation method, a fragrance, a dye, a preservative, or any combination thereof. In some aspects, the hand soap detergent composition comprises water, an alkyl ether sulfate derived from bio-content and accounted for using a mass balanced allocation method, a fragrance, a dye, a preservative, or any combination thereof.

In some aspects, the body wash detergent composition comprises water, a surfactant derived from bio-content and accounted for using a mass balanced allocation method, a zwitterionic surfactant, a fragrance, an organic acid, a preservative, or any combination thereof. In some aspects, the body wash detergent composition comprises water, an alkyl ether sulfate derived from bio-content and accounted for using a mass balanced allocation method, a cocamidopropyl betaine, a fragrance, lactic acid, or any combination thereof.

All of the references cited above, as well as all references cited herein, are incorporated herein by reference in their entireties.

Any examples provided herein are offered by way of illustration and not by way of limitation.

EXAMPLES

Example 1: Biomass Balanced Formula

One way to prepare laundry detergent from renewable carbon is to use fatty acid soaps. U.S. Patent Publication No. 2017/0121641 describes a natural laundry detergent composition comprising natural soap as a surfactant. The soaps are comprised of blends of fatty acids neutralized with sodium or potassium hydroxide. It is well known that fatty acid soaps are inferior in performance to surfactants such as alcohol ethoxylates and alkyl ethoxylate sulfates.

The compositions disclosed herein are compared to a leading commercial plant derived laundry detergent. According to the Smartlabel ingredient listing on the company website, this detergent contains two main plant derived surfactants; laureth-6 and sodium lauryl sulfate. This product is used as a benchmark of a renewable sourced laundry detergent in the Examples below.

Liquid laundry detergents containing plant derived surfactants and liquid laundry detergents with surfactants derived from bio-content and accounted for using a mass balanced allocation method (as disclosed herein) were prepared. The two plant surfactants utilized were partially derived from plant sourcing. In particular, the alkyl chain was derived from plant oils, but the ethoxylation portion of the molecule was derived from petroleum. The surfactants derived from bio-content and accounted for using a mass balanced allocation method are 100% derived from renewable resources. The renewable carbon content of the plant derived surfactant formula below is 55%. The renewable carbon content of surfactant derived from bio-content and accounted for using a mass balanced allocation method formula below is 98%.

Renewable carbon is calculated by dividing the carbon derived from renewable sources by the total carbon in the formula. Only organic carbon is counted.

The plant derived surfactant formula and the formula derived from bio-content and accounted for using a mass balanced allocation method liquid laundry composition as disclosed herein were prepared with the ingredients and amounts as listed in Table 1 below.

TABLE 1

Formulations of plant derived and biomass balanced derived liquid laundry detergents.

| Ingredient | Plant derived surfactant formula Active wt % | Bio-content derived surfactant formula Active wt % |
|---|---|---|
| Bio-content derived $C_{12}$-$C_{15}$ alcohol ethoxylate sulfate with 3 moles of ethylene oxide (SLES) | — | 6 |
| Plant derived alkyl chain, sodium lauryl ether sulfate with 2 moles ethylene oxide (SLES); Steol CS-270 | 6 | — |
| Bio-content derived $C_{12}$-$C_{15}$ alcohol ethoxylate containing an average of approximately 7 moles of ethylene oxide (AE) | — | 12 |
| Plant derived alkyl chain, $C_{12}$-$C_{14}$ alcohol ethoxylate with 7 moles ethylene oxide. Trade name Surfonic L24-7 from Huntsman | 12 | — |

TABLE 1-continued

Formulations of plant derived and biomass balanced derived liquid laundry detergents.

| Ingredient | Plant derived surfactant formula Active wt % | Bio-content derived surfactant formula Active wt % |
|---|---|---|
| Fatty acid soap | 0.25 | 0.25 |
| sodium carbonate | 1.75 | 1.75 |
| builder | 0.5 | 0.5 |
| preservative | 0.03 | 0.03 |
| Cleaning polymer | 0.25 | 0.25 |
| Water | q.s. | q.s. |
| Renewable carbon content | 55% | 98% |

Example 2: Biomass Balanced Formula Wash Test

The plant derived and bio-content derived formulations as described above and the leading commercial plant derived laundry detergent formulation were prepared and tested for cleaning performance. The wash test consisted of duplicate washes in a traditional top loading washing machine at 90° F. and 59° F. in 120 ppm hardness water. Two fabrics were used: knitted cotton (KC) and knitted blend (KB). Cleaning performance was measured and reported as SRI values as according to equation 10.3.2.4 described in ASTM D4265-14 and shown below. A value of 100% is complete stain removal.

Stain removal performance was recorded as SRI values and is reported for each stain. The formula with the best stain removal for each stain and fabric combination is highlighted in bold. The SRI values for the combined set of stains and fabrics is totaled to represent a composite cleaning score. The higher the value the better the overall stain removal. The stain removal performance for the three formulations at 90° F. and 59° F. are shown in Table 2 and Table 3 below.

TABLE 2

Stain Removal Performance at 90° F. SRI values:

| | | Leading commercial plant derived laundry detergent | Bio-content derived surfactants | Plant derived surfactants |
|---|---|---|---|---|
| blood | KC | 80.60 | **82.10** | 81.45 |
| | KB | 81.10 | **83.05** | 82.03 |
| Chocolate | KC | **94.29** | 88.76 | 88.46 |
| ice cream | KB | **90.80** | 88.30 | 87.88 |
| coffee | KC | **85.36** | 84.81 | 85.15 |
| | KB | **82.82** | 82.51 | 81.94 |
| Dust | KC | 74.49 | **79.50** | 78.66 |
| sebum | KB | 72.09 | **76.96** | 76.39 |
| Grape | KC | 84.90 | **86.65** | 86.83 |
| juice | KB | 86.27 | **87.49** | 87.13 |
| grass | KC | 70.86 | **71.89** | 71.30 |
| | KB | 70.27 | 72.78 | **73.06** |
| BBQ | KC | **95.42** | 95.16 | 94.51 |
| sauce | KB | 89.53 | **90.21** | 89.32 |
| mud | KC | **74.97** | 74.76 | 74.54 |
| | KB | 76.17 | **76.70** | 76.45 |
| Total SRI | | 1309.9 | **1321.6** | 1315.1 |
| Number of stain wins | | 6 | **9** | 1 |

TABLE 3

| Stain Removal Performance at 59° F. SRI values: | | | | |
|---|---|---|---|---|
| | | Leading commercial plant derived laundry detergent | Bio-content derived surfactants | Plant derived surfactants |
| Blood | KC | 78.89 | **81.68** | 81.34 |
| | KB | 80.09 | 82.38 | **82.82** |
| Chocolate | KC | **90.19** | 84.06 | 84.46 |
| Ice cream | KB | **89.81** | 86.05 | 85.21 |
| Coffee | KC | 83.07 | **84.35** | 84.12 |
| | KB | 80.44 | 81.32 | **81.43** |
| Dust Sebum | KC | 73.65 | **77.25** | 77.11 |
| | KB | 71.60 | **74.99** | 74.89 |
| Grape Juice | KC | 80.23 | **82.82** | 82.33 |
| | KB | 83.23 | **86.12** | 86.02 |
| Grass | KC | 69.38 | 70.96 | **71.30** |
| | KB | 67.66 | **70.49** | 70.26 |
| BBQ Sauce | KC | 94.00 | **94.40** | 93.27 |
| | KB | 89.10 | **89.81** | 89.25 |
| Mud | KC | 73.13 | **73.48** | 72.81 |
| | KB | 74.75 | **75.74** | 75.57 |
| total SRI | | 1279.2 | **1295.9** | 1292.2 |
| # stain wins | | 2 | **11** | 3 |

Calculation of SRI uses the following equation:

$$SRI = 100 * \frac{\Delta E*_{(US-UF)} - \Delta E*_{(WS-UF)}}{\Delta E*_{(US-UF)}} \quad (1)$$

where:

US=Unwashed stain area,

UF—Unwashed (unstained) fabric area;

WS=Washed stain area $\Delta E*_{(U\ S-U\ F)}$=Delta-E color difference between the unwashed stain and the unwashed fabric, and $\Delta E*_{(W\ S-U\ F)}$=Delta-E color difference between the washed stain and the unwashed fabric.

The value delta E* is calculated as:

$$\Delta E* = \sqrt{\Delta L^{*2}} + \Delta a^{*2} + \Delta b^{*2}$$

At both temperatures, the bio-content derived formula gave superior cleaning over the plant derived formula and over the benchmark commercial plant derived laundry detergent formula.

Without wishing to be bound by theory, possible explanations for the improved performance of the biomass balance derived alcohol ethoxylates over plant based alcohol ethoxylates is the nature of the alkyl chain. The carbon from plant oils are straight chain with even numbers of carbon atoms. The number of carbons in the chain and degree of unsaturation depends on the plant from with the oil was derived. The alkyl chain from surfactants derived from bio-content and accounted for using a mass balanced allocation method can contain both even and odd numbers of carbon atoms and the alkyl chain can have branching. Alkyl chain length for the $C_{12}$-$C_{15}$ alcohol ethoxylates is longer than for the plant derived alcohol ethoxylates in the examples, which are $C_{12}$-$C_{14}$. Longer chain length and branching can help cleaning performance. Branching can help since the branched alkyl chain is less crystalline and can penetrate into oily soils on fabrics better than more crystalline straight chain alkyl carbon groups.

Further exemplary formulas can be made by combining SLES and alcohol ethoxylate derived from bio-content and accounted for using a mass balanced allocation method with petroleum derived surfactants such as linear alkyl benzene sulfonate, lauramine oxide, cocamidopropylbetaine, sodium lauryl sulfate and other ingredients.

The compositions containing surfactants derived from bio-content and accounted for using a mass balanced allocation method may include other surfactants, enzymes, polymers, builders, fragrances and other common laundry detergent additives which are derived from petroleum, plants or biomass balanced.

A list of additional surfactants which are suitable is provided in WO 2022/219102, the disclosure of which is incorporated herein in its entirety.

Other patent literature on providing laundry detergents from renewable carbon are incorporated by reference to this application. For example, WO 2022/122425 to Unilever, which describes alcohol ethoxylate or alkyl ether sulfate derived from renewable sourcing. In this publication, alkyl chain length is C16/18 and is derived from plant, algae, fungi, yeast or bacteria; and preferred plant sources of oils are rapeseed, sunflower, maze, soy, cottonseed, olive oil, palm oil and rapeseed oil. Another example is US 2017/0121641 which describes fatty acid soap laundry detergents.

The present disclosure has been described above with the aid of functional building blocks illustrating the implementation of specified functions and relationships thereof. The boundaries of these functional building blocks have been arbitrarily defined herein for the convenience of the description.

Alternate boundaries can be defined so long as the specified functions and relationships thereof are appropriately performed.

The foregoing description of the embodiments will so fully reveal the general nature of the invention that others can, by applying knowledge within the skill of the art, readily modify and/or adapt for various applications such embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A detergent composition comprising:

a. at least one surfactant comprising an alkyl chain and at least two ethoxylate units wherein at least 20% of the carbon content of the surfactant is derived from bio-content and accounted for using a mass balanced allocation method;

b. at least one additive selected from surfactants, soaps, alkalinity agents, buffers, chelating agents, builders, preservatives, polymers, enzymes, fragrances, dyes, and any combination thereof, and c. water, wherein a mass balanced allocation method refers to a traceability protocol to match carbon output with carbon input according to the equation below $$\text{Input mass of eligible biomass } X \text{ Conversion Factor} = \text{Mass of biobased output to be allocated to product}$$

wherein eligible biomass is raw materials and waste of biological origin, and biobased output is the mass of biomass or biobased allocations to be assigned to products from a chemical process or series of processes, and wherein the conversion factor is calculated based on the following equation:

$$\text{Conversion Factor} = \frac{\text{Sum of mass of all eligible outputs}}{\text{Sum of mass of all eligible inputs}},$$

wherein eligible inputs are the eligible biomass, and eligible outputs are the products collected from the chemical process or series of processes, and wherein the conversion factor is derived from process operational data.

2. The detergent composition of claim 1, wherein the alkyl chain of the at least one surfactant contains a $C_{12}$-$C_{15}$ chain.

3. The detergent composition of claim 2, wherein the at least one surfactant is selected from an alcohol ethoxylate, and an alkyl ether sulfate.

4. The detergent composition of claim 3, wherein the at least one surfactant has an average of about 2 to 10 moles of ethylene oxide per mole of alcohol.

5. The detergent composition of claim 4, wherein the at least one surfactant is sodium lauryl ether sulfate (SLES), an alcohol ethoxylate, or combinations thereof.

6. The detergent composition of claim 1, wherein the at least one surfactant is present in an amount of about 0.1 wt. % to about 35 wt. %.

7. The detergent composition of claim 1, wherein the at least one surfactant comprises branching in an alkyl chain.

8. The detergent composition of claim 1, wherein the at least one additive is derived from petroleum, plants, or other biobased sources.

9. The detergent composition of claim 1, wherein the composition is a unit dose laundry detergent.

10. The detergent composition of claim 9, wherein the composition further comprises one or more enzymes selected from proteases, amylases, lipases, and mannanases.

11. The detergent composition of claim 1, wherein the composition is a hand soap detergent.

12. A liquid laundry detergent composition comprising:

a. about 0.1 wt. % to about 35 wt. % of at least one surfactant comprising an alkyl chain and at least two ethoxylate units wherein at least 20% of the carbon content of the at least one surfactant is derived from bio-content and accounted for using a mass balanced allocation method;

b. at least one additive selected from surfactants, soaps, alkalinity agents, buffers, chelating agents, builders, preservatives, polymers, enzymes, fragrances, dyes, and any combination thereof; and c. water, wherein a mass balanced allocation method refers to a traceability protocol to match carbon output with carbon input according to the equation below $$\text{Input mass of eligible biomass } X \text{ Conversion Factor} = \text{Mass of biobased output to be allocated to product}$$

wherein eligible biomass is raw materials and waste of biological origin, and biobased output is the mass of biomass or biobased allocations to be assigned to products from a chemical process or series of processes, and wherein the conversion factor is calculated based on the following equation:

$$\text{Conversion Factor} = \frac{\text{Sum of mass of all eligible outputs}}{\text{Sum of mass of all eligible inputs}},$$

wherein eligible inputs are the eligible biomass, and eligible outputs are the products collected from the chemical process or series of processes, and wherein the conversion factor is derived from actual process operational data.

13. The laundry detergent composition of claim 12, wherein the alkyl chain of the at least one surfactant contains a $C_{12}$-$C_{15}$ chain.

14. The laundry detergent composition of claim 13, wherein the at least one surfactant is selected from an alcohol ethoxylate, an alkyl ether sulfate, and an alkyl ether carboxylate.

15. The laundry detergent composition of claim 14, wherein the at least one surfactant has an average of about 2 to 10 moles of ethylene oxide per mole of alcohol.

16. The laundry detergent composition of claim 15, wherein the at least one surfactant is sodium lauryl ether sulfate (SLES), an alcohol ethoxylate, or combinations thereof.

17. The laundry detergent composition of claim 16, wherein the composition comprises SLES in an amount of about 1 wt. % to about 15 wt. % and an alcohol ethoxylate in an amount of about 0.1 wt. % to about 20 wt. %.

18. The laundry detergent composition of claim 12, wherein the composition further comprises an alkaline salt selected from sodium carbonate, sodium bicarbonate, sodium chloride, and calcium chloride.

19. The laundry detergent composition of claim 12, wherein the at least one additive is derived from petroleum, plants, or other biobased sources.

20. The laundry detergent composition of claim 12, wherein the at least one surfactant comprises branching in an alkyl chain.

21. The laundry detergent composition of claim 12, wherein the composition comprises at least one enzyme selected from proteases, amylases, lipases, and mannanases.

* * * * *